United States Patent
Gotthelf

(10) Patent No.: US 7,165,573 B2
(45) Date of Patent: Jan. 23, 2007

(54) COMPRESSED NATURAL GAS PRESSURE REGULATOR

(75) Inventor: Jeffrey B. Gotthelf, Summerville, SC (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 224 days.

(21) Appl. No.: 10/722,708

(22) Filed: Nov. 25, 2003

(65) Prior Publication Data

US 2005/0109403 A1   May 26, 2005

(51) Int. Cl.
 *G05D 16/06*  (2006.01)
(52) U.S. Cl. .................. 137/505.34; 137/549
(58) Field of Classification Search ........... 137/505.34, 137/505.42, 549; 251/332
See application file for complete search history.

(56) References Cited

U.S. PATENT DOCUMENTS

| | | | |
|---|---|---|---|
| 2,698,026 A * | 12/1954 | Roberts et al. ............. | 137/458 |
| 2,770,252 A | 11/1956 | Bass, Sr. | |
| 2,808,481 A * | 10/1957 | Brennan .............. | 200/61.58 R |
| 3,086,548 A * | 4/1963 | Galiger et al. ........... | 137/484.8 |
| 3,204,657 A * | 9/1965 | Boyd ...................... | 137/484.8 |
| 3,545,471 A * | 12/1970 | Taplin .................... | 137/116.5 |
| 3,753,446 A * | 8/1973 | Hoogeboom ............. | 137/484.8 |
| 3,911,948 A * | 10/1975 | Collins et al. ......... | 137/505.42 |
| 5,033,505 A * | 7/1991 | Eidsmore ............... | 137/505.39 |
| 5,303,734 A * | 4/1994 | Eidsmore ............... | 137/505.43 |
| 5,381,819 A | 1/1995 | Gotthelf | |
| 5,443,083 A | 8/1995 | Gotthelf | |
| 5,890,512 A | 4/1999 | Gotthelf et al. | |
| 6,079,434 A * | 6/2000 | Reid et al. ..................... | 137/14 |
| 6,155,290 A * | 12/2000 | Nakajima et al. ...... | 137/505.41 |
| 6,273,117 B1 * | 8/2001 | McPhee ....................... | 137/12 |

FOREIGN PATENT DOCUMENTS

FR    2 849 934 A1    7/2004

* cited by examiner

*Primary Examiner*—Stephen M. Hepperle
(74) *Attorney, Agent, or Firm*—RatnerPrestia

(57) ABSTRACT

A pressure-reducing regulator comprising a regulator body having an inlet port, an outlet port, and a flow path. A valve element is moved relative to a valve seat by a diaphragm assembly to control gas flow along the flow path. The regulator comprises one or more of: (a) a coalescing filter mounted in the inlet port, (b) the diaphragm assembly coupled to the valve element via a resilient member, (c) a diaphragm chamber comprising a non-constant depth in the regulator body along its diameter, (d) an aspirator tube extending into the outlet port from a passage between the diaphragm chamber and the outlet port, or (e) the valve seat comprising an inner seat and a protective covering over the inner seat.

30 Claims, 8 Drawing Sheets

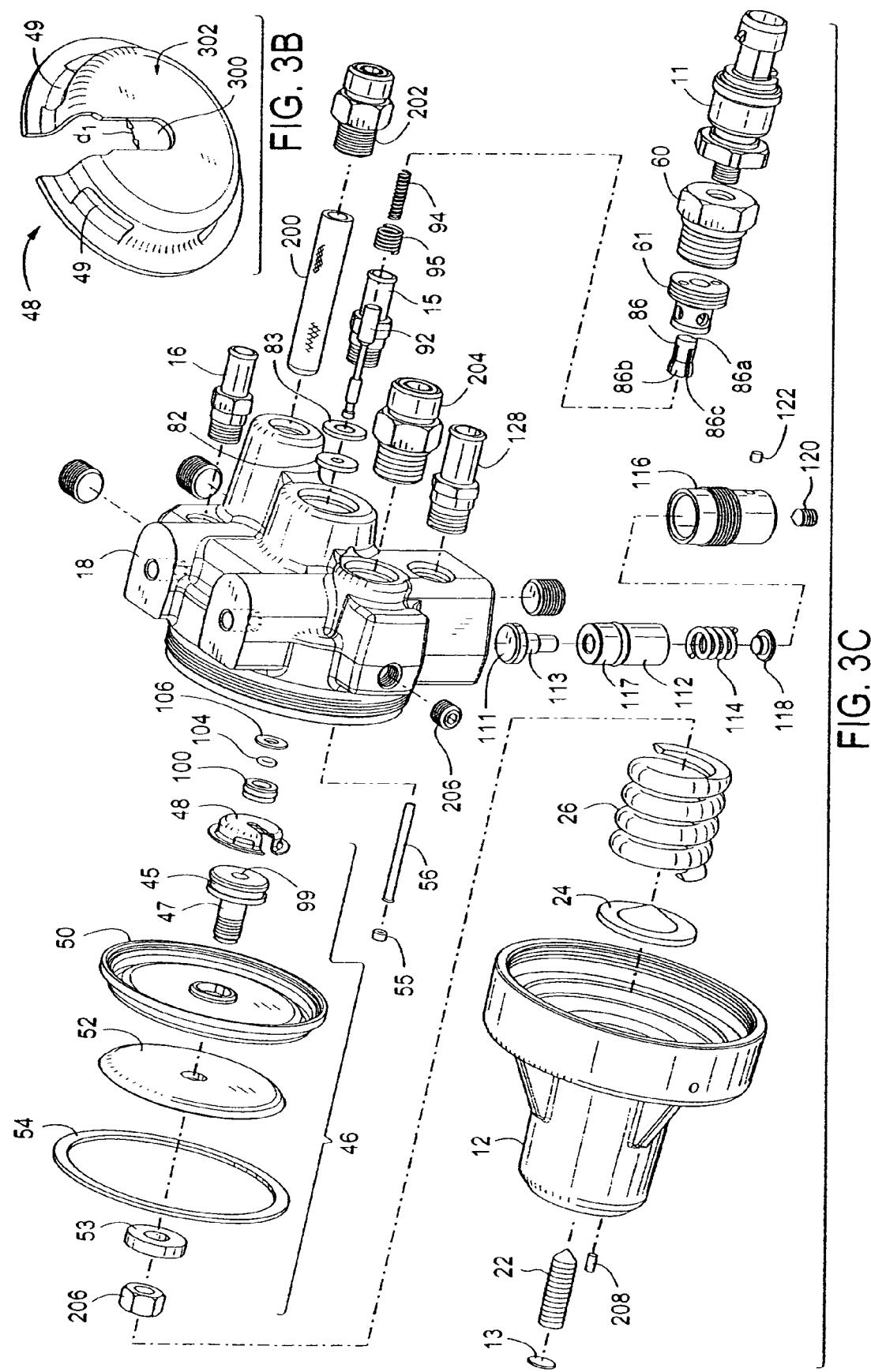

COMPRESSED NATURAL GAS PRESSURE REGULATOR

FIELD OF THE INVENTION

This invention relates to pressure regulators, specifically pressure regulators used in compressed natural gas (CNG) service, more specifically pressure regulators used in natural-gas-fueled vehicles.

BACKGROUND OF THE INVENTION

U.S. Pat. Nos. 5,443,083; 5,381,819; and 5,890,512; each of which is incorporated herein by reference, disclose a number of regulator designs for use in CNG service. Each of these applications also names as either the sole inventor or as a co-inventor, Jeffrey Gotthelf, the inventor of this application. Each of these designs has many elements that are similar to elements of the regulator design of the present invention.

Coalescing filters are commonly required in CNG lines upstream of the pressure-reducing regulator to protect the regulator from entrained oil. Although one or more of the designs disclosed in the above references include particulate filters, particulate filters typically cannot remove entrained oil. Over time, entrained oil may foul the regulator and inhibit its performance. The need for upstream coalescing filters requires additional cost and takes up space in existing fuel systems, and with each connection also creates additional risk of gas leakage.

Regulators having flow bypass designs (where the gas flow does not flow through the diaphragm chamber) with improved transient response characteristics are desirable, as is reduction of output pressure overshoot when inlet pressure is suddenly applied. It is also desirable to provide shock absorption in the element that connects the diaphragm assembly to the valve element.

SUMMARY OF THE INVENTION

The invention comprises an improved pressure-reducing regulator. Gas regulators typically comprise a regulator body having an inlet port, an outlet port, and a flow path through the regulator body between the inlet port and the outlet port. A valve element is movably disposed within the body relative to a valve seat for controlling gas flow in the flow path. A diaphragm assembly is mounted within a diaphragm chamber and is coupled to the valve element for moving the valve element relative to the valve seat. In addition to these common features, gas regulators of the present invention may have one or more of the aspects described below.

One aspect of invention comprises a coalescing filter mounted upstream of the valve assembly, typically in the inlet port of the regulator, particularly a coalescing filter adapted to remove oil from compressed natural gas (CNG). In one embodiment, the inlet port may be adapted to receive an inlet fitting, where the inlet fitting is adapted to receive an upstream end of the coalescing filter. In another embodiment, a biasing member may be provided between a closed downstream end of the coalescing filter and a downstream end of the inlet passage for biasing the coalescing filter against the inlet fitting.

In another aspect of the invention, the diaphragm assembly is coupled to the valve assembly via a resilient member. In one embodiment, the valve assembly stem portion comprises a head, a shoulder, and a neck positioned between the head and the shoulder, the head and the shoulder both having a greater diameter than the diameter of the neck. The resilient member comprises a sheet-like planar member having a slot wider than the diameter of the neck but narrower than the diameters of the head and the body and adapted to receive the neck of the valve assembly. The diaphragm assembly may comprise an insert having a valve-facing end with a slot or a central hole for receiving the valve assembly head, in which the planar member comprises a slotted cap for affixing over the valve-facing end of the insert.

In yet another aspect of the invention, the diaphragm chamber has a diameter and comprises an indentation in the regulator body that is not of a constant depth along the diaphragm chamber diameter. In particular, the diaphragm chamber may have a longitudinal section contour that follows the longitudinal section contour of the diaphragm assembly. Where the diaphragm assembly comprises a diaphragm having a flat valve-facing surface and a centrally mounted valve-engaging protrusion, for example, the diaphragm chamber may comprise a central well having a greater depth than a peripheral portion of the chamber.

In still another aspect of the invention, a passage adapted to provide fluid communication between the outlet port and the diaphragm chamber may comprise an aspirator tube mounted in the passage and extending into the outlet port. In one embodiment, the aspirator tube may extend into an interior passage of an outlet fitting mounted in the outlet port. In particular, the aspirator tube may be annularly positioned within the interior passage of the outlet fitting.

In yet one more aspect of the invention, the valve seat may comprise an inner seat and a protective covering over a portion of the inner seat. The valve element may be a component of a valve assembly that comprises an inner valve body that surrounds a valve plug portion of the valve element, in which case the protective covering is mounted over a portion of the inner seat that receives compressive loading transmitted by the inner valve body. The protective covering may further comprise an opening to permit the valve plug to directly contact the inner seat. The protective covering may comprise a bearing washer, and may comprise, for example a metal such as brass.

Pressure reducing regulators of the present invention may have only one of the above aspects of the invention, or a combination of the aspects, including all of the aspects, or fewer than all of the aspects.

BRIEF DESCRIPTION OF THE DRAWINGS

FIG. 3B is a detailed isometric view of an exemplary slotted cap.

FIG. 3C is an exploded isometric view of the regulator of FIG. 1A.

DETAILED DESCRIPTION OF THE INVENTION

Figure 2A:
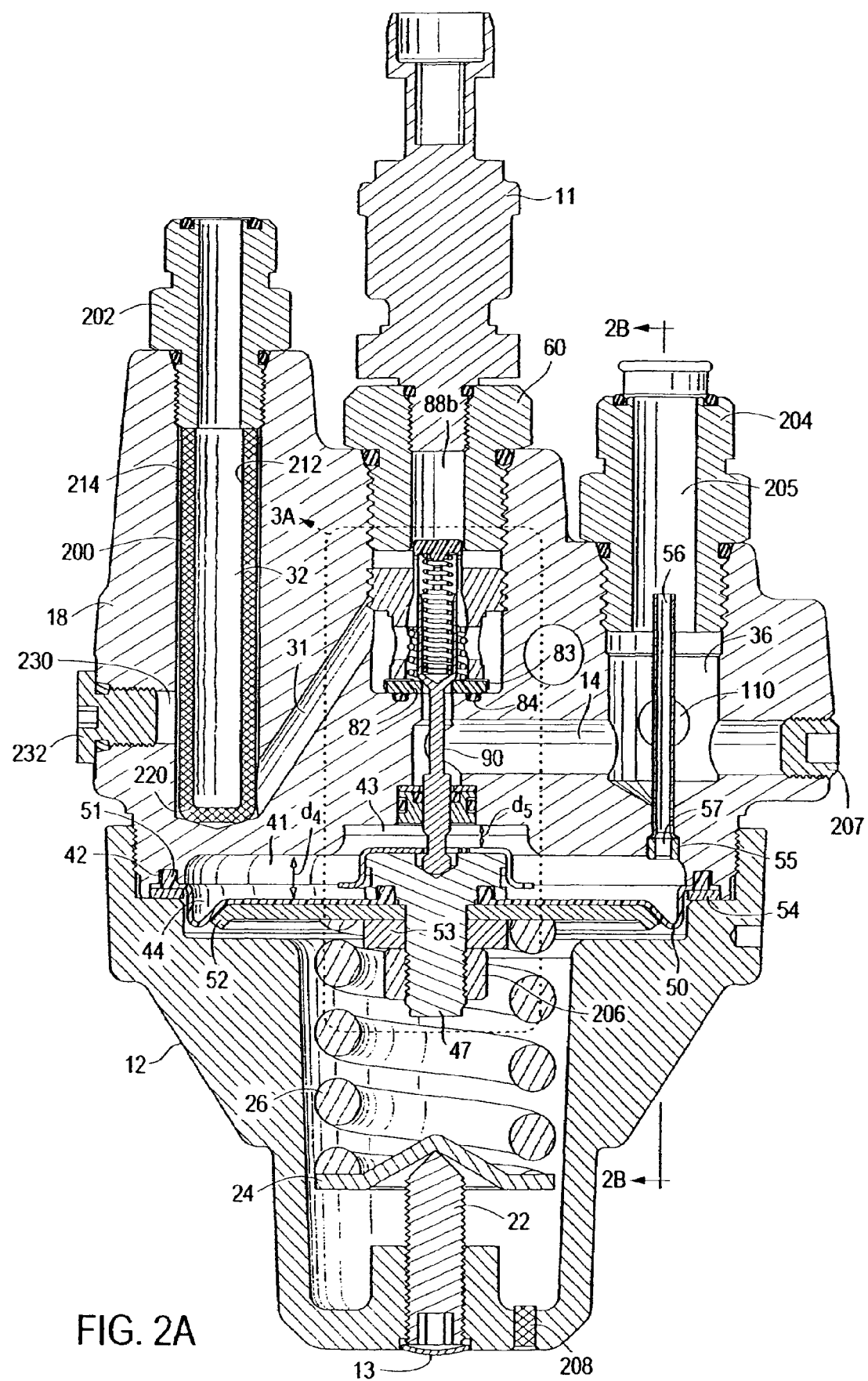
FIG. 2A is a longitudinal-section illustration of an exemplary pressure regulator of the present invention taken across arrows 2A—2A of FIGS. 1B and 1E.
Figure 2B:
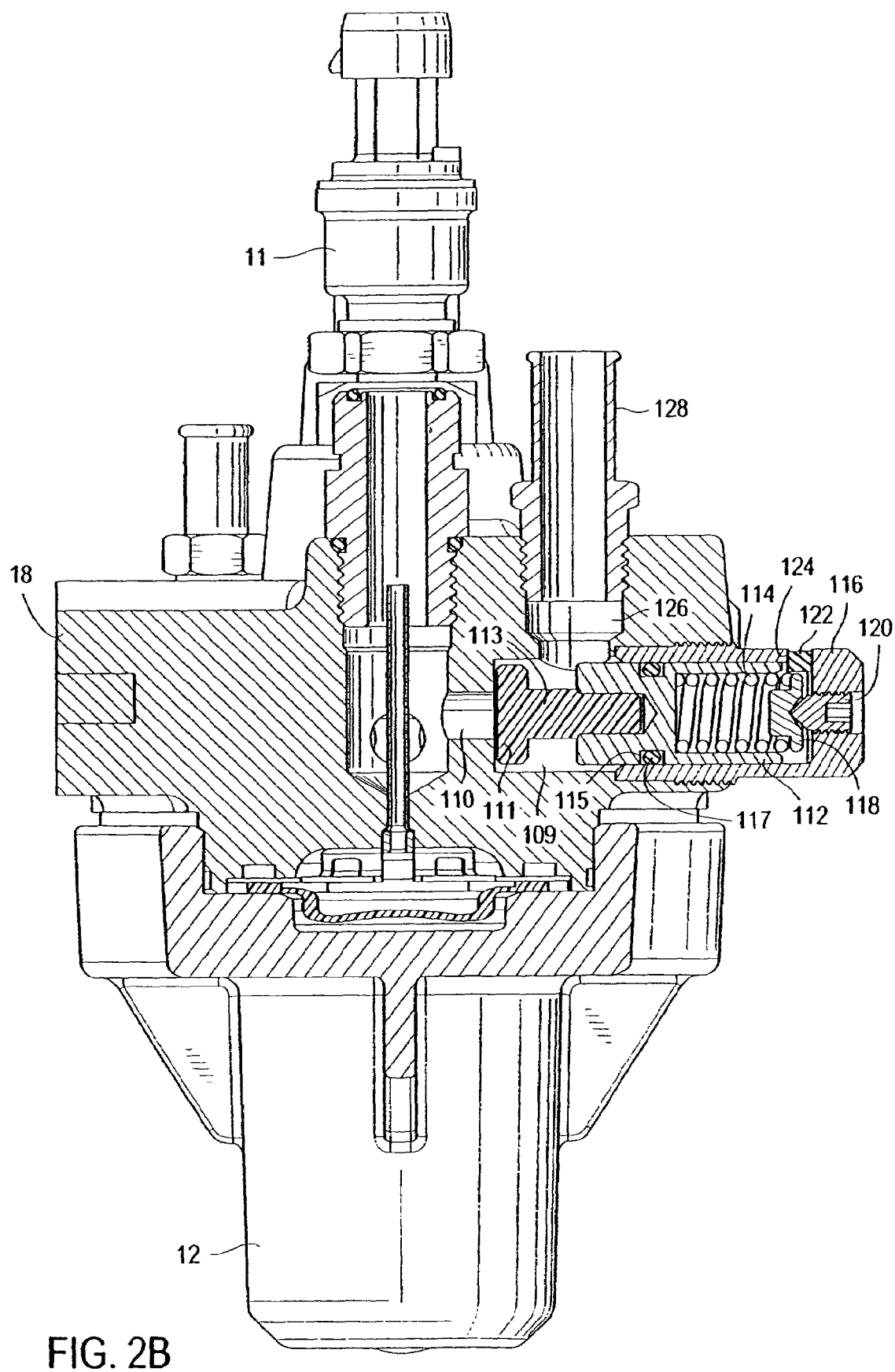
FIG. 2B is a longitudinal-section illustration of an exemplary pressure regulator of the present invention taken across arrows 2B—2B of FIGS. 1B, 1E and 2A.
Figure 3A:
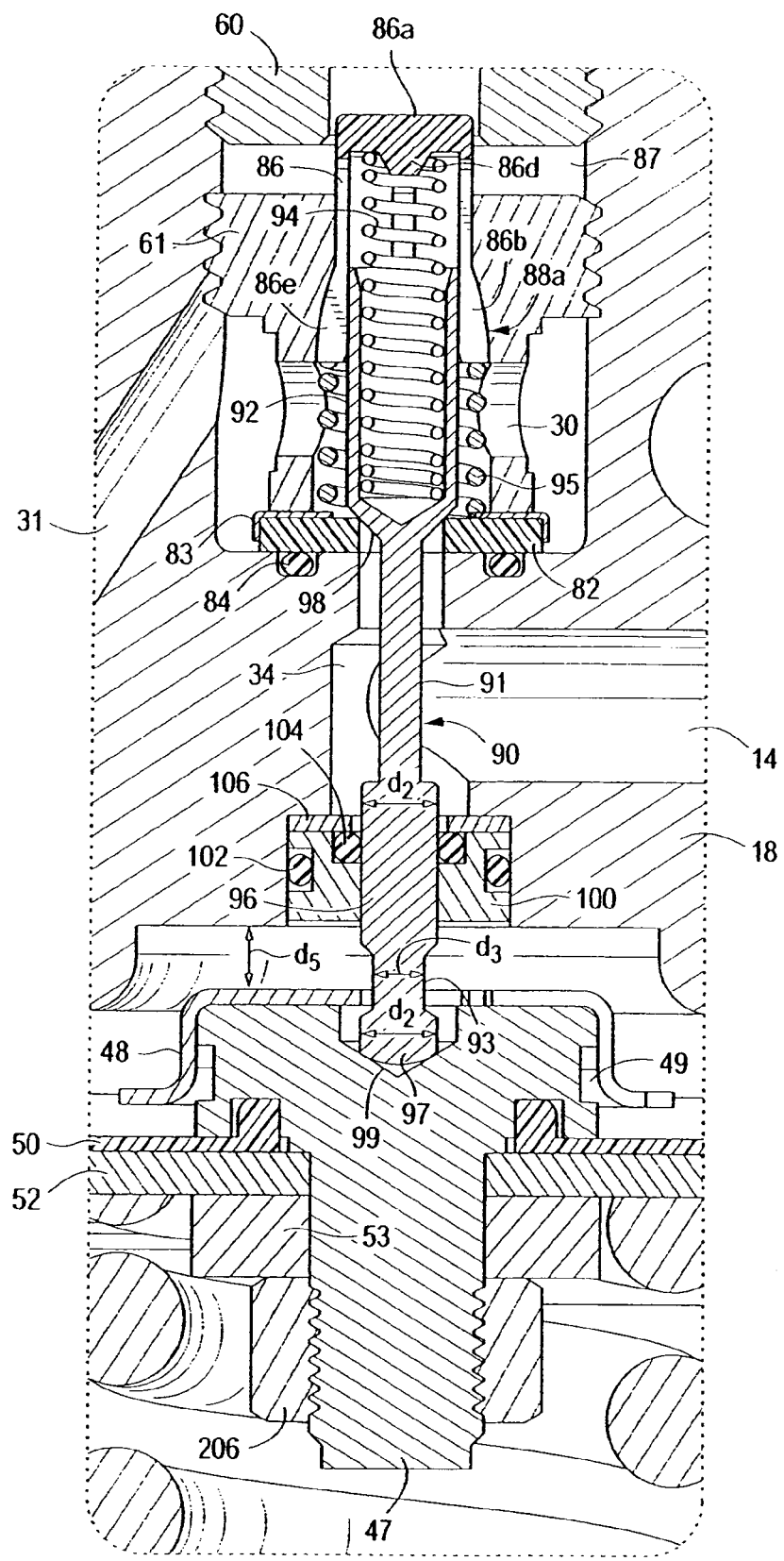
FIG. 3A is a detailed view of a portion of FIG. 2A showing the diaphragm and valve plug assemblies.

The invention will next be described with respect to exemplary embodiments shown in the figures. Referring to FIGS. 1A–1E, there are shown various views of regulator 10 having a bonnet 12 and regulator body 18. FIGS. 2A–2B show longitudinal sections of the same regulator, and FIGS. 3A–3C show detailed and exploded views of various features of the regulator.

Figure 1A:
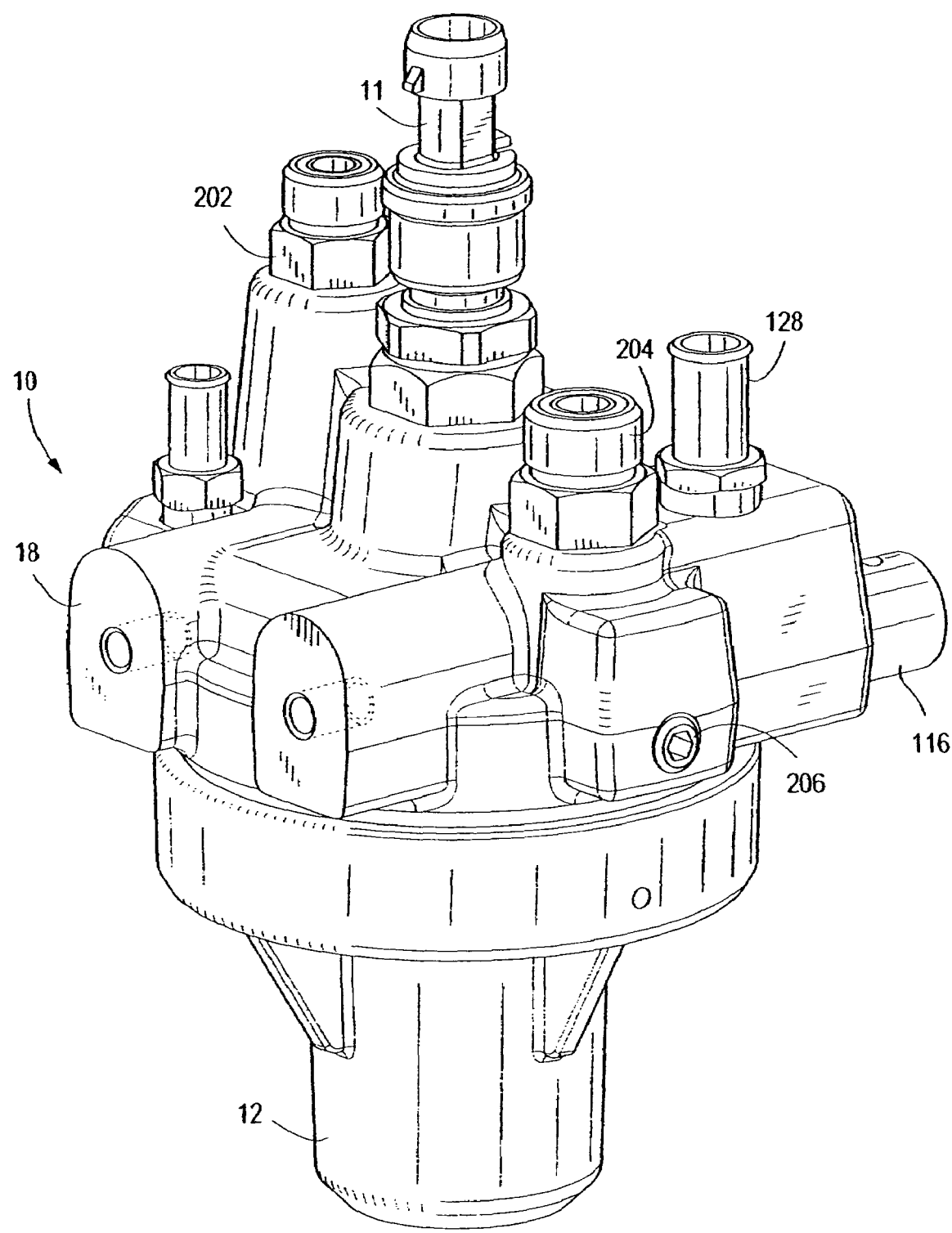
FIG. 1A is an isometric view of an exemplary pressure regulator of the present invention.
Figure 1B:
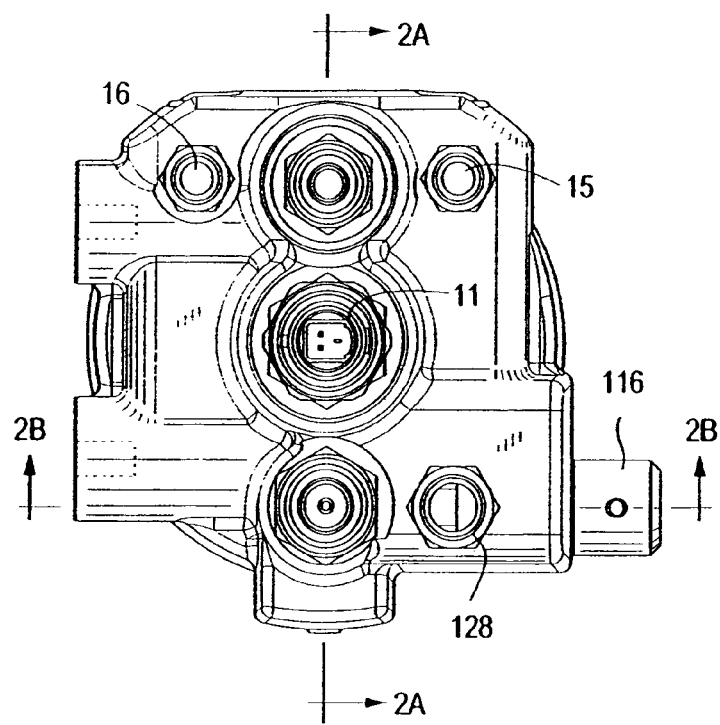
FIG. 1B is bottom view of the pressure regulator of FIG. 1A.
Figure 1C:
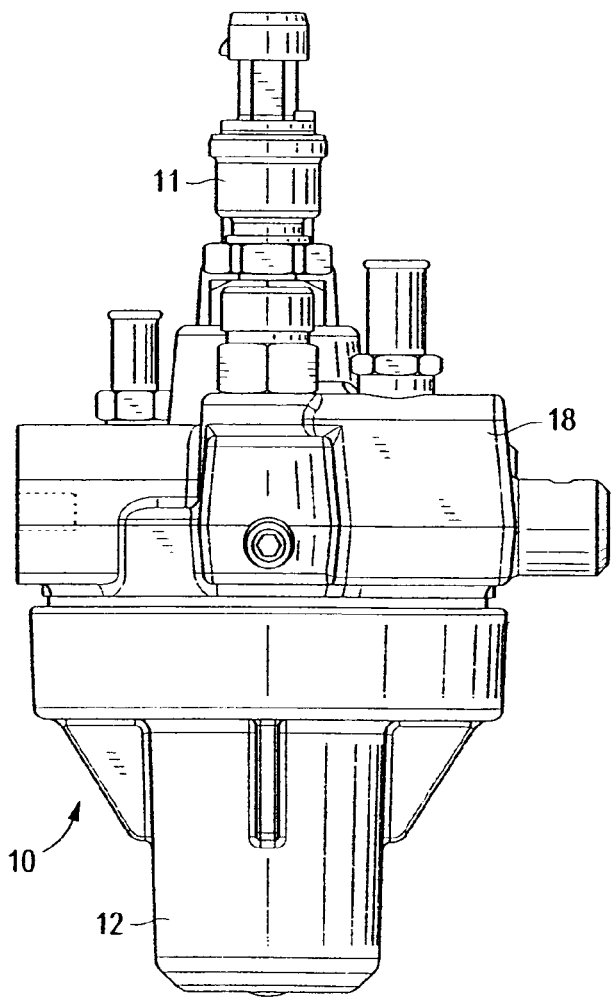
FIG. 1C is a left side view of the pressure regulator of FIG. 1A.
Figure 1D:
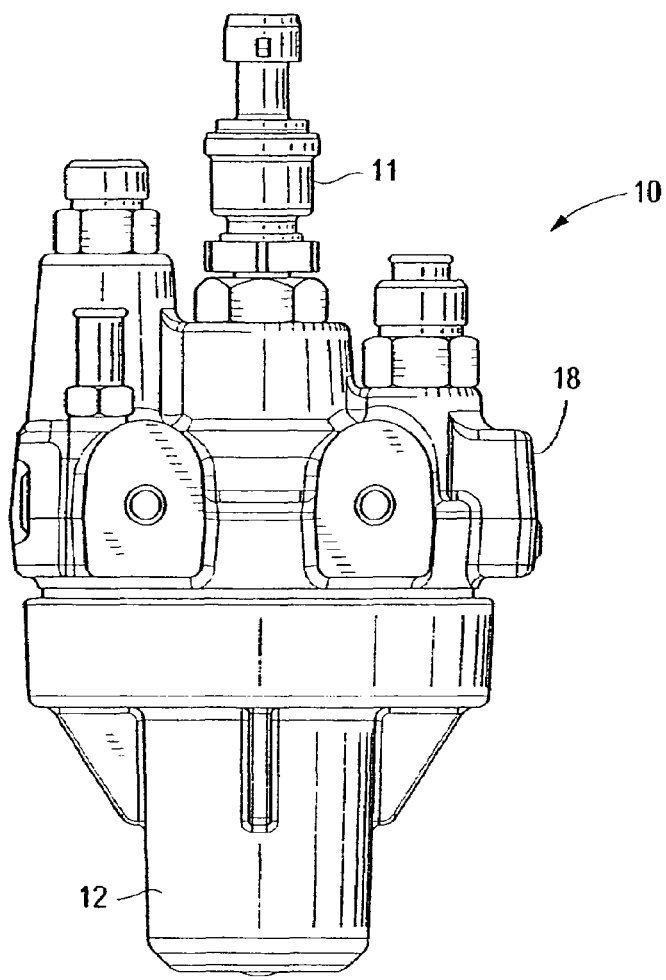
FIG. 1D is front side view of the pressure regulator of FIG. 1A

As shown in FIG. 1B, the regulator may have a heat exchange fluid inlet port 15 and a heat exchange fluid outlet port 16 to accommodate the inflow and discharge of a heat exchange fluid, such as antifreeze coolant from a vehicle coolant system. The typically warm engine coolant warms the regulator to prevent overcooling due to the temperature drop inherent in the expansion of the compressed gas across the valve of the regulator. Mounting hardware 11 as shown is used for mounting the regulator for a particular application. The regulator may be mounted in any way, however, and is not limited to use with any particular type of mounting hardware.

Figure 1E:
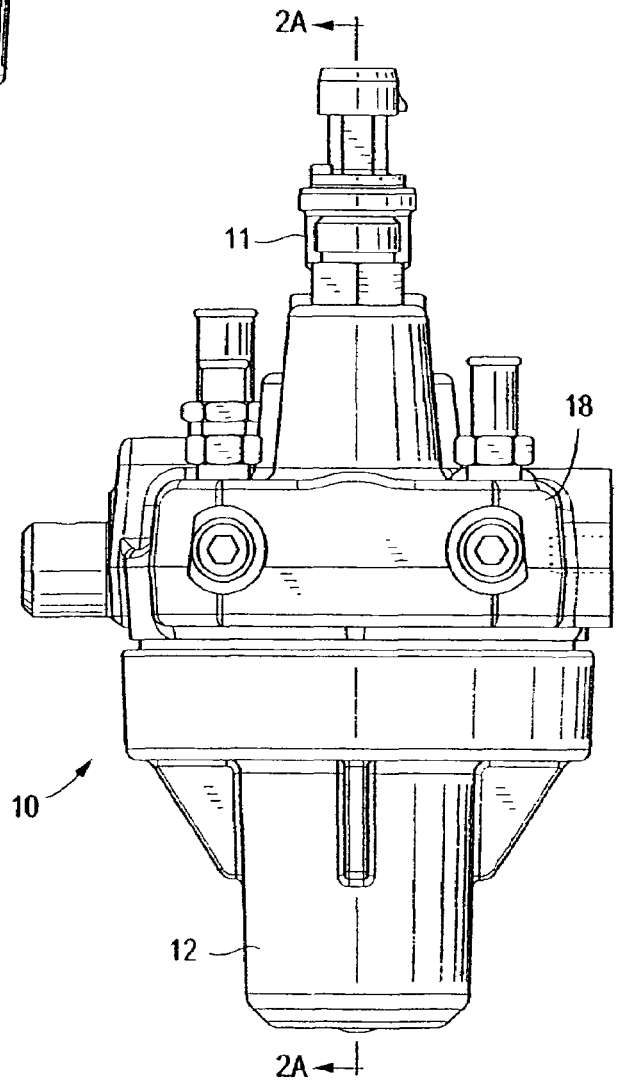
FIG. 1E is an right side view of the pressure regulator of FIG. 1C.

Referring now to FIGS. 2A, there is shown a longitudinal-sectional view of the regulator taken along section 2A—2A of FIGS. 1B and 1E. The regulator 10 has a bonnet 12, and a regulator body 18. Bonnet 12, which is threadably engaged with the body 18, includes the adjustment screw cover 13, an adjustment screw 22, a spring button 24 for transferring the loading from the screw to a spring 26, and an ambient pressure passage outfitted with a porous plug 208. The bonnet and body may be fabricated of aluminum and coated to prevent corrosion, or fabricated from a corrosive resistive material. The screw, spring button, and spring are preferably fabricated of stainless steel for its corrosive resistant properties. The hydrophobic porous plug is preferably formed of polytetrafluoroethylene (PTFE) which is sufficient to permit atmospheric pressure to enter the bonnet, but prevents an intrusion of water such as splashing from roadways and the like, as is well known in the art.

The regulator body 18 has an inner chamber 30 for receiving high-pressure CNG from a gas inlet port 32, and a connecting passageway 31. Outer chamber 34 is separated from inner chamber by inner seat 82 against which the conical top 98 of valve plug 96 seats in a closed position. When the valve plug is unseated, outer chamber 34 receives low-pressure CNG from the inner chamber. Inner seat 82 is preferably plastic and abuts O-ring 84 mounted in regulator body 18. Bearing washer 83 comprises a relatively thin, for example about 0.012 inches thick, brass member that covers the valve side of inner seat 82 to prevent localized compressive damage to the valve seat during assembly of the inner valve body. The bearing washer 83 has a larger diameter central hole than the inner seat 82, such that the valve plug 96 only makes contact with inner seat 82. Although shown in the drawings with a discrete bearing washer 83 and inner seat 82, the inner seat and bearing washer may be a single integral member, such as an inner seat with a metal laminate covering, or the seat may be present without the bearing as is well known in the art. Thus, the term "seat" as used herein, including in the claims, is intended to mean whatever surface against which the valve plug seats, regardless of the detailed construction of the seat assembly. Seat spring 95 biases bearing washer 83 against inner seat 82, which in turn biases inner seat 82 against O-ring 84. With valve plug 96 unseated, the low-pressure CNG then flows out of outer chamber 34 into outlet connecting passage 14 to outlet passage 36. Plug 207 merely closes off outlet connecting passage 14, which is typically drilled from the side during fabrication.

The uppermost surface of body 18 has a circular groove 42 formed therein. Diaphragm assembly 46 comprises a diaphragm insert 47, a slotted cap 48, a diaphragm 50 with a peripheral rib 51, a diaphragm plate 52, a washer 53, and a nut 206. The diaphragm 50 and the body 18 forms a diaphragm cavity or chamber. The insert, plate and nut are preferably fabricated of stainless steel for corrosion resistance, and the diaphragm is preferably fabricated of Buna-N with a DACRON® polyester reinforcement. Rib 51 is nested in groove 42 and a bearing ring 54 surmounts the periphery of diaphragm 50.

A plug bushing 86 having a taper at one end and a cylindrical interior is inserted into the tapered and cylindrical bore 88a that extends through inner valve body 61. Outer valve body 60, includes a cylindrical bore 88b for receiving the end of plug bushing, seals off valve chamber 87. Plug bushing 86 may have a closed end 86a with four cylindrically shaped finger elements 86b formed by slots 86c. Although four finger elements have been used, two, three, or a multiple thereof could be used. The bottom interior portion of the bushing has a centrally located protrusion 86d, such as a cone, for centrally positioning the valve spring 94. The four finger elements have tapered ends 86e to complimentary fit the tapered and cylindrical bore 88a. Valve spring 94 preloads tapered ends 86e of bushing 86 against the tapered bore 88a of inner valve body 61. Slots 86c in bushing 86 allow the inner diameter of the bushing to decrease as the bushing slides into the tapered valve body bore, permitting easy assembly while creating an interference fit bushing with a self-adjustment feature. The PEEK plastic material chosen for the bushing is self-lubricating and does not interfere with the regulator performance.

Valve element 90 has a central shank 91 with a tubular body 92 on one end for containing valve spring 94, and a valve plug 96 on the other end terminating in insert 47 where it is engaged by slotted cap 48. The conical top 98 of tubular body 92 connects to central shank 91 and contacts valve seat 82 to close off inner chamber 30 from outer chamber 34.

The valve plug 96 slidably passes through plug guide 100 which includes O-rings 102 and 104. Guide 100 is positioned on washer 106, which is typically made of stainless steel. Tapered plug bushing 86 is preferably fabricated of a self-lubricating material of suitable strength, temperature, and chemical resistance, such as but not limited to PEEK or TORLON® polyamide-imide, and valve element 90 preferably comprises a heat treat hardened stainless steel (such as 17-4 pH). Plug guide 100 is preferably brass and washer 106 is preferably stainless steel to prevent corrosion. The invention, however, is not limited to any particular materials of construction for any of its parts.

Aspirator tube 56 communicates the gas pressure in the outlet port 36 with the diaphragm chamber 44 in the regulator body 18. In one embodiment, aspirator tube 56 may extend into interior passage 205 of outlet fitting 204. Aspirator tube bushing 55 mounts on top of aspirator tube 56 to keep it in place. The fluid dynamics of the annular arrangement of aspirator hole 56 within interior passage 205 of outlet fitting 204 creates an annular orifice that exposes the aspirator outlet to a slightly lower pressure when gas flows from outlet port passage 36 into the outlet fitting passage 205. The lower pressure is communicated into the diaphragm chamber and thereby provides feedback to the regulator indicating that the output pressure is lower than it truly is. In response, the diaphragm moves further down, the valve opens slightly more, and the regulated output pressure increases slightly to maintain the dynamic equilibrium. This allows the regulator to compensate for line pressure losses at higher gas flowrates, thereby keeping the gas pressure output more uniform and providing improved pressure control for the fuel system.

An exemplary pressure relief device for regulator 10 is shown in FIGS. 2B and 3C. A pressure relief port 109 is connected to outlet connecting passage 14 and outlet port 36 via relief passage 110. Positioned against passage 110 is a brass or plastic poppet 113 fitted with a rubber disk 111 that contacts passage 110 when the valve is closed. Poppet piston 112 has a cylindrical interior for containing a portion of poppet spring 114, which is typically stainless steel but may be of any material known in the art, and a groove 115 which contains an o-ring 117. A relief valve bonnet 116 is threadably engaged in the port 110 and has a cylindrical interior to contain the poppet piston 112, to provide a sliding sealing surface for the poppet piston o-ring, and to contain a portion of the poppet spring 114. A spring button 118, typically brass, is inserted into the poppet spring 114. Set screw 120, such as a cone point set screw, provides spring compression adjustment capabilities to adjust the pressure required in passage 110 to move the poppet 113 and poppet piston to an open position. Plug 122, preferably similar in construction to plug 208 described previously herein, rests in an ambient pressure passage 124 to keep out the elements while allowing equilibrium with atmospheric pressure inside the poppet bonnet. When the pressure in passage 110 is greater than a predetermined amount, poppet 113 will force poppet piston 112 to compress spring 114, allowing gas to escape into pressure relief outlet 126, where it moves through outlet fitting 128 and any connected conduit (not shown) to a desired location where it can be safely dispersed.

The regulator may be typically designed to operate with compressed natural gas at 250–3600 PSIG inlet pressure and a 99–125 PSIG output pressure at a nominal 110 psig setting, although the design is not limited to any particular pressure ranges. The pressure regulator may be specifically useful for safely reducing the pressure of CNG from a vehicle storage tank (typically up to 3600 PSIG) to a preset level which allows an engine fuel metering system to properly control the gas. This is accomplished by the pressure sensing element and controlled force moving the valve element to regulate gas flow in response to downstream pressure levels. The valve element provides stable flow for various operating conditions and the diaphragm provides precise sensing. The valve element permits controlled gas flow between the high-pressure inner chamber, and the low-pressure outer chamber, through a gap between the conical top portion of the valve element and the valve seat. To prevent moisture and ice accumulation problems, the regulator may be adapted to allow circulation of engine coolant around the valve chamber, as is well-known in the art.

In operation, with no demand (closed condition) on gas outlet 36, the pressure in diaphragm chamber 44 builds to equal pressure in outlet 36. The higher pressure is sensed in diaphragm chamber 44 and diaphragm assembly 46 pushes against spring 26. Insert 48 pulls valve plug 96 until the conical top portion 98 of the valve element 90 contacts valve seat 82, sealing off the inner chamber 30 from the outer chamber 34.

When there is a gas demand (open condition) in the outlet port 36, the pressure in diaphragm chamber 44 decreases to equal the pressure in outlet 36. The lower pressure is sensed in chamber 44 and the spring 26 pushes against diaphragm means 46 causing movement of valve element 90 and an opening of a gap between valve seat 82 and the conical top portion 98 of the valve element. The gap opening will be in proportion to the drop in pressure in diaphragm chamber 44. The movement of the valve element maintains a condition of equilibrium between the outlet and the diaphragm chamber.

Inlet passage 32 is improved over previous designs by the addition of coalescing filter 200, which removes not only particulate contaminants from the system, but also removes oil. The coalescing filter separates inlet passage 32 into an inner chamber 212 and an outer chamber 214. The inlet gas flows outward from the inner chamber 212 through the coalescing filter 200 into outer chamber 214. Oil coalesces in the coalescing filter 200 and collects in outer chamber 214. A drain 230 is provided that can be periodically opened by removing drain plug 232 to allow the oil to be drained from the outer chamber 214.

Regulator 10 is depicted in FIGS. 1C–2B in an orientation with bonnet 18 facing downward. While the regulator is not limited to operation in any orientation, and the drain hole is not limited to any particular location, it is generally desirable for regulators with coalescing filters to be oriented with the drain hole in the lowest possible position so that the coalesced and collected oil or other liquid can be drained out the drain hole via gravity. Accordingly, where drain hole 230 is positioned as shown in FIG. 2B, it is desirable for the regulator to be oriented such that the drain hole faces bottom. In particular, if the regulator is oriented in an angled position such that the bonnet points in a generally downward direction, the regulator is preferably rotated so that the drain hole is positioned on the lowermost side of the regulator.

Figure 4:
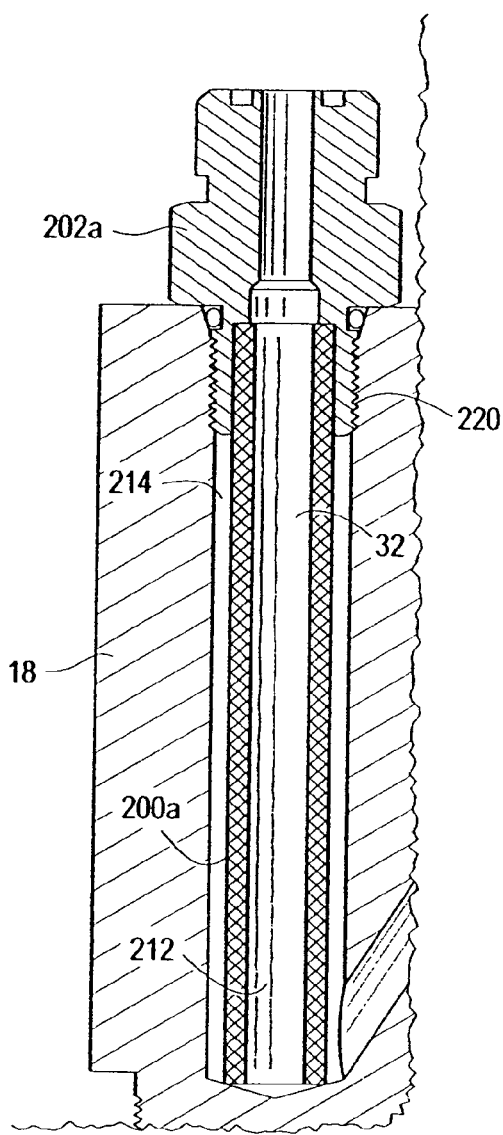
FIG. 4 is a longitudinal-section illustration of an alternate pressure regulator embodiment, showing only the interface between the inlet and the coalescing filter.
Figure 5:
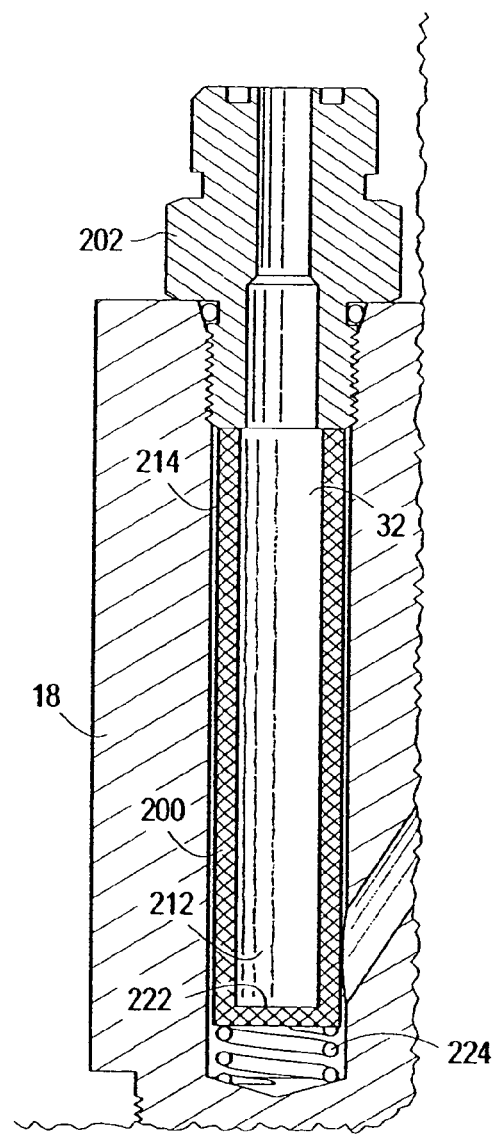
FIG. 5 is a longitudinal-section illustration of another alternate pressure regulator embodiment, showing only the interface between the inlet and the coalescing filter.

In the embodiment shown in FIG. 1, inlet fitting 202 holds coalescing filter 200 in place against the downstream end of inlet passage 32, where closed end 222 of filter 200 abuts body 18. In an alternate embodiment, shown in FIG. 4, inlet fitting 202*a* may have a bore 220 to accept the upstream end of filter 200*a*. In another embodiment, shown in FIG. 5, a spring 224 or other biasing member may hold the filter 200 against inlet fitting 202.

The addition of an integral coalescing filter eliminates the need for a discrete coalescing filter placed upstream of the regulator, thus saving space, cost, and minimizing fuel system leak potential. The coalescing element may be any type of element known in the art for removal of oil from compressed natural gas, including but not limited to a matrix of synthetic microfibers such as borosilicate glass.

Another aspect of the invention, shown in more detail in FIGS. 3A–3C, comprises slotted cap 48 for connecting valve plug 96 to diaphragm 50. Head 97 of valve plug 96 is contained within hole 99 in insert 47 and is held in place by slotted cap 48. Slotted cap 48 has a slot 300 which has a diameter d1 that is smaller than diameter d2 of head 97 and shoulder 95 of valve plug 96 but which is larger than diameter d3 of neck 93. Retaining head 97 with the relatively thin, resilient, planar end 302 of slotted cap 48 provides more flexibility than retaining it using a lip formed from the solid material of insert 47, as is typical of regulators of the prior art (see, e.g., end 198 retained in insert 194 as shown in FIG. 7 of U.S. Pat. No. 5,443,083). Thus, the interface between slotted cap 48 and head 97 is flexible enough to reduce shock loading of the valve when pressure is applied from the inlet of the regulator when there is no flow demand, such as when the ignition key is initially turned in a natural gas vehicle and energizes a normally closed high pressure solenoid valve.

As shown in FIGS. 3A–3C, slotted cap 48 is retained on the diaphragm assembly by several tabs 49 which engage a groove 45 in the perimeter of insert 47. Insert 47 is threadably held in place against diaphragm 50 and diaphragm plate 52 by nut 206 and washer 53. The invention is not limited to any particular engagement between the cap and the insert, however, or between the insert and the diaphragm. Similarly, although depicted as a cap having a planar end, the resilient member is not limited to a cap configuration or even a planar configuration. For example, the flexibility may be provided using a resilient valve stem member or portion thereof, rather than providing the flexibility in the member that attaches the valve assembly to the diaphragm assembly.

Yet another aspect of the invention comprises a reduced-volume diaphragm chamber 44 as compared to diaphragm chambers of the prior art. The reduction specifically takes the form of a diaphragm chamber 44 that in a longitudinal section as shown in FIG. 2A follows the valve-facing longitudinal-section contour of diaphragm 50 and insert 47. This results in the diaphragm chamber bed comprising an indentation in regulator body 18 formed with a central, relatively deeper well 43 and a peripheral, relatively shallower outer portion 41, rather than a diaphragm chamber bed of constant depth along the entire diameter of the chamber, as is disclosed in the prior art. As can be seen from FIG. 2A, the well 43 is less than half the length of the diameter of the diaphragm chamber 44.

The reduced volume of the diaphragm chamber reduces the time to change chamber pressure, allowing the regulator to more quickly respond to changing conditions. The gap between the regulator body 18 and the diaphragm assembly 46 with the valve in the seated position may be constant throughout the diaphragm chamber, or variable. Typically, because it is more desirable for cap 48 rather than diaphragm 50 to make contact with body 18 in the event that a diaphragm "bottoms-out", the distance d5 between regulator body 18 and diaphragm 50 tends to be smaller between cap 48 and body 18 in central well 43 than distance d4 between diaphragm 50 and body 18 in outer portion 41.

Still another aspect of the invention comprises aspirator tube 56, which preferably comprises en extension tube 56 that protrudes from aspirator passage 57 and into outlet passage 36 in regulator body 18, and further may extend into interior passage 205 of outlet fitting 204. As noted above, extension into the interior of the outlet fitting may reduce pressure in the diaphragm chamber at higher flows because of compressible flow phenomenon relating to the annular, typically coaxial, position of the aspirator tube within the interior passage. The end of extension tube 56 may be positioned anywhere in the outlet passage, however, including terminating upstream of the outlet fitting, terminating even with the inlet of the outlet fitting, or inside the interior passage of the outlet fitting, as shown.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A pressure-reducing regulator comprising:
   a regulator body having an inlet port, an outlet port, and a flow path through the regulator body between the inlet port and the outlet port;
   a valve element movably disposed within the body relative to a valve seat for controlling gas flow in the flow path;
   a diaphragm assembly mounted within a diaphragm chamber and coupled to the valve element for moving the valve element relative to the valve seat; and
   a coalescing filter mounted within the regulator body in the flow path upstream of the valve element, wherein flow through the coalescing filter is from its inside to its outside wherein the inlet port receives an inlet fitting and the inlet fitting receives an upstream end of the coalescing filter.

2. The regulator of claim 1, wherein the coalescing filter removes oil from compressed natural gas.

3. A pressure-reducing regulator comprising:
   a regulator body having an inlet port, an outlet port, and a flow path through the regulator body between the inlet port and the outlet port;
   a valve element movably disposed within the body relative to a valve seat for controlling gas flow in the flow path;
   a diaphragm assembly mounted within a diaphragm chamber and coupled to the valve element for moving the valve element relative to the valve seat; and
   a coalescing filter mounted upstream of the valve element, wherein the inlet port further comprises an inlet passage in the regulator body having a downstream end and an open upstream end adapted to receive an inlet fitting, the coalescing filter further comprises a closed downstream end, and the regulator further comprises a biasing member between the closed downstream end of the coalescing filter and the downstream end of the inlet passage for biasing the coalescing filter against the inlet fitting.

4. A pressure-reducing regulator comprising:
   a regulator body having an inlet port, an outlet port, and a flow path through the regulator body between the inlet port and the outlet port;
   a valve element movably disposed within the body relative to a valve seat for controlling gas flow in the flow path;
   a diaphragm assembly mounted within a diaphragm chamber and coupled to the valve element for moving the valve element relative to the valve seat; and
   a coalescing filter mounted upstream of the valve element, wherein the inlet port further comprises an inlet passage in the regulator body having a downstream end and an open upstream end adapted to receive an inlet fitting, the coalescing filter further comprises a closed downstream end, and
   wherein the regulator further comprises a biasing member between the closed downstream end of the coalescing filter and the downstream end of the inlet passage for biasing the coalescing filter against the inlet fitting, wherein the biasing member comprises a spring.

5. A pressure-reducing regulator comprising:
   a regulator body having an inlet port, an outlet port, and a flow path through the regulator body between the inlet port and the outlet port;

a valve element movably disposed within the body relative to a valve seat for controlling gas flow in the flow path;

a coalescing filter mounted within the regulator body in the flow path upstream of the valve element, wherein flow through the coalescing filter is from its inside to its outside; and a diaphragm assembly mounted within a diaphragm chamber and coupled to the valve element for moving the valve element relative to the valve seat;

wherein the diaphragm assembly is coupled to the valve element via a resilient member outside of the flow path wherein the valve element comprises a stem portion having a head, a shoulder, and a neck positioned between the head and the shoulder, the head and the shoulder both having a greater diameter than the diameter of the neck, the resilient member comprising a planar member having a slot wider than the diameter of the neck, narrower than the diameters of the head and the shoulder, and adapted to receive the neck.

6. The regulator of claim 5, further comprising an insert attached to the diaphragm assembly, the insert comprising a valve-facing end having a slot for receiving the valve assembly head, the planar member comprising a slotted cap for affixing over the valve-facing end of the insert.

7. The regulator of claim 1, wherein the diaphragm chamber has a diameter and comprises an indentation in the regulator body that is of a non-constant depth along the diaphragm chamber diameter.

8. The regulator of claim 5, wherein the diaphragm chamber has a diameter and comprises an indentation in the regulator body that is of a non-constant depth along the diaphragm chamber diameter.

9. The regulator of claim 1, further comprising a drain in fluid communication with the coalescing filter.

10. A pressure-reducing regulator comprising:

a regulator body having an inlet port, an outlet port, and a flow path through the regulator body between the inlet port and the outlet port;

a valve element movably disposed within the body relative to a valve seat for controlling gas flow in the flow path;

a diaphragm assembly mounted within a diaphragm chamber and coupled to the valve element for moving the valve element relative to the valve seat; and an insert attached to the diaphragm assembly, the insert comprising a valve-facing end having a slot for receiving the valve assembly head, the planar member comprising a slotted cap for affixing over the valve-facing end of the insert;

wherein the diaphragm assembly is coupled to the valve element via a resilient member, wherein the valve element comprises a stem portion having a head, a shoulder, and a neck positioned between the head and the shoulder, the head and the shoulder both having a greater diameter than the diameter of the neck, the resilient member comprising a planar member having a slot wider than the diameter of the neck, narrower than the diameters of the head and the shoulder, and adapted to receive the valve assembly neck, and wherein the valve-facing end of the insert comprises a peripheral groove and the slotted cap comprises a plurality of tabs for engaging the peripheral groove of the insert for affixing the slotted cap to the insert.

11. A pressure-reducing regulator comprising:

a regulator body having an inlet port, an outlet port, and a flow path through the regulator body between the inlet port and the outlet port;

a valve element movably disposed within the body relative to a valve seat for controlling gas flow in the flow path;

a coalescing filter mounted within the regulator body in the flow path upstream of the valve element; and a diaphragm assembly mounted within a diaphragm chamber and coupled to the valve element for moving the valve element relative to the valve seat, the diaphragm chamber having a diameter and comprising an indentation in the regulator body that is of a non-constant depth along the diaphragm chamber diameter, wherein the indentation is less than half the length of the diaphragm chamber diameter.

12. The regulator of claim 11, wherein the diaphragm assembly has a valve-facing longitudinal section contour and the diaphragm chamber has a longitudinal section contour that follows the longitudinal section contour of the diaphragm assembly.

13. The regulator of claim 12, wherein the diaphragm assembly comprises a diaphragm having a flat valve-facing surface and a centrally mounted valve-engaging protrusion.

14. The regulator of claim 13, wherein the indentation comprises a central well having a greater depth within the regulator body than a peripheral portion of the chamber.

15. The regulator of claim 14, comprising, with the valve in a seated position, a first distance between the peripheral portion of the chamber and the diaphragm, and a second distance between the central well of the chamber and the centrally mounted valve-engaging protrusion, wherein the second distance is less than or equal to the first distance.

16. A pressure-reducing regulator comprising:

a regulator body having an inlet port, an outlet port, and a flow path through the regulator body between the inlet port and the outlet port;

a valve element movably disposed within the body relative to a valve seat for controlling gas flow in the flow path;

a coalescing filter mounted within the regulator body in the flow path upstream of the valve element, wherein flow through the coalescing filter is from its inside to its outside; and a diaphragm assembly mounted within a diaphragm chamber and mechanically coupled to the valve element for moving the valve element relative to the valve seat, and a passage adapted to provide fluid communication between the outlet port and the diaphragm chamber, the passage comprising an aspirator tube mounted in the passage and extending into the outlet port wherein the aspirator tube is annularly positioned within the outlet port.

17. The regulator of claim 16, further comprising an outlet fitting having an interior passage mounted in the outlet port, wherein the aspirator tube extends into the interior passage of the outlet fitting.

18. The regulator of claim 16, wherein the diaphragm assembly is coupled to the valve element via a resilient member.

19. The regulator of claim 16, wherein the diaphragm assembly is coupled to the valve element via a resilient member.

20. The regulator of claim 19, wherein the diaphragm chamber has a diameter and comprises an indentation in the regulator body that is of a non-constant depth along the diaphragm chamber diameter.

21. The regulator of claim 18, wherein the diaphragm chamber has a diameter and comprises an indentation in the regulator body that is of a non-constant depth along the diaphragm chamber diameter.

22. The regulator of claim 17, wherein the diaphragm chamber has a diameter and comprises an indentation in the regulator body that is of a non-constant depth along the diaphragm chamber diameter.

23. The regulator of claim 16, wherein the diaphragm chamber has a diameter and comprises an indentation in the regulator body that is of a non-constant depth along the diaphragm chamber diameter.

24. A pressure-reducing regulator comprising:
   a regulator body having an inlet port, an outlet port, and a flow path through the regulator body between the inlet port and the outlet port;
   a valve element movably disposed within the body relative to a valve seat for controlling gas flow in the flow path;
   a coalescing filter mounted within the regulator body in the flow path upstream of the valve element; and
   a diaphragm assembly mounted within a diaphragm chamber outside of the flow path and coupled to the valve element for moving the valve element relative to the valve seat; and
   wherein the valve seat comprises an inner seat and a protective covering over a portion of the inner seat.

25. The regulator of claim 24, wherein the valve element is a component of a valve assembly that comprises an inner valve body that surrounds a valve plug portion of the valve element, the protective covering mounted over a portion of the inner seat that receives compressive loading transmitted by the inner valve body.

26. The regulator of claim 25, wherein the protective covering further comprises an opening to permit the valve plug to directly contact the inner seat.

27. The regulator of claim 24, wherein the protective covering comprises a bearing washer.

28. The regulator of claim 24, wherein the protective covering comprises a thin layer of metal.

29. The regulator of claim 26, wherein the protective covering comprises brass.

30. A pressure-reducing regulator comprising:
   a regulator body having an inlet port, an outlet port, and a flow path through the regulator body between the inlet port and the outlet port;
   a valve element movably disposed within the body relative to a valve seat for controlling gas flow in the flow path, wherein the valve element comprises a stem portion having a head, a shoulder, and a neck positioned between the head and the shoulder, the head and the shoulder both having a greater diameter than the diameter of the neck, the resilient member comprising a planar member having a slot wider than the diameter of the neck, narrower than the diameters of the head and the shoulder, and adapted to receive the valve assembly neck;
   a diaphragm assembly mounted within a diaphragm chamber and coupled to the valve element for moving the valve element relative to the valve seat; and
   an insert attached to the diaphragm assembly, the insert comprising a valve-facing end having a slot for receiving the valve assembly head, the planar member comprising a slotted cap for affixing over the valve-facing end of the insert.

* * * * *